(12) United States Patent
Elliot et al.

(10) Patent No.: US 6,973,572 B1
(45) Date of Patent: Dec. 6, 2005

(54) SIGNATURE HASH FOR CHECKING VERSIONS OF ABSTRACT DATA TYPES

(75) Inventors: Steven K. Elliot, Sunnyvale, CA (US); Saileshwar Krishnamurthy, San Jose, CA (US); Bruce Gilbert Lindsay, San Jose, CA (US); Rajendra Bhagwatisingh Panwar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/514,607

(22) Filed: Feb. 28, 2000

Related U.S. Application Data (60) Provisional application No. 60/130,594, filed on Apr. 22, 1999.

(51) Int. Cl.$^7$ .............................................. H04I 9/28
(52) U.S. Cl. ..................................... 713/176; 707/203
(58) Field of Search ................................ 713/200, 167; 707/203; 715/511

(56) References Cited

U.S. PATENT DOCUMENTS

| | | | |
|---|---|---|---|
| 5,019,963 A | | 5/1991 | Alderson et al. |
| 5,343,527 A | * | 8/1994 | Moore ........................ 713/179 |
| 5,504,885 A | * | 4/1996 | Alashqur ..................... 717/141 |
| 5,721,919 A | * | 2/1998 | Morel et al. ................. 707/203 |
| 5,724,576 A | | 3/1998 | Letourneau |
| 5,778,362 A | | 7/1998 | Deerwester |
| 6,105,072 A | * | 8/2000 | Fischer ....................... 709/315 |
| 6,112,024 A | * | 8/2000 | Almond et al. ............. 717/122 |
| 6,145,747 A | * | 11/2000 | Wu ............................. 235/486 |
| 6,292,880 B1 | * | 9/2001 | Mattis et al. ............... 711/216 |
| 6,622,247 B1 | * | 9/2003 | Isaak .......................... 713/155 |

FOREIGN PATENT DOCUMENTS

JP 09325884 12/1997

* cited by examiner

*Primary Examiner*—Gregory Morse
*Assistant Examiner*—Andrew L. Nalven
(74) *Attorney, Agent, or Firm*—Gates & Cooper LLP (57) ABSTRACT

A method, apparatus, and article of manufacture for providing to a signature hash for checking versions of abstract data types. An identifier is constructed for the abstract data type that is substantially unique to the abstract data type, wherein the identifier comprises a concatenation of various attributes for the abstract data type. The constructed identifier is hashed to generate a signature hash value for the abstract data type, which is then stored both in the database and a class definition for the abstract data type. When the class definition is instantiated as a library function, it accesses the abstract data type from the database, and compares the signature hash value from the database and the signature hash value from the class definition in order to verify that the class definition is not outdated. The class definition is outdated when the abstract data type has been altered without the signature hash value being re-generated and re-stored in the database and the class definition.

40 Claims, 3 Drawing Sheets

SIGNATURE HASH FOR CHECKING VERSIONS OF ABSTRACT DATA TYPES

CROSS-REFERENCE TO RELATED APPLICATIONS

This application claims the benefit under 35 U.S.C §119(e) of now abandoned and commonly-assigned U.S. Provisional application Ser. No. 60/130,594, entitled "SIGNATURE HASH FOR CHECKING VERSIONS OF ABSTRACT DATA TYPES," filed on Apr. 22, 1999, by Steven K. Elliot, Saileshwar Krishnamurthy, Bruce G. Lindsay, and Rajendra B. Panwar, which application is incorporated by reference herein.

BACKGROUND OF THE INVENTION

1. Field of the Invention

The present invention relates generally to abstract data types, and in particular, to a signature hash for checking versions of abstract data types.

2. Description of Related Art

It is well known in the art to use abstract data types (ADTs) with relational database management systems (RDBMS), such as IBM's Database 2 (DB2™) Universal Database (UDB™). An abstract data type (ADT) object is a compound object that can include audio, video, image, text, spatial data (e.g., shape, point, line, polygon, etc.), time series data, OLE (object linking and embedding) documents, Java objects, C++ objects, etc., along with meta-information about the objects. ADTs include user-defined structured types, an arbitrary number of attributes, and nested ADT objects. Additionally, ADTs provide for inheritance, either where all objects inherit attributes from one or more "super" types or where objects can inherit attributes from multiple other objects (i.e., multiple inheritance).

The operations allowed for ADTs include observer, mutator, constructor, copy constructor, and user-defined functions (UDFs). Each attribute has an observer function that obtains the value of that attribute for an object. Each attribute has a mutator function that enables updating the attribute. Each ADT object has a constructor function that enables creating an instance of an object of that abstract data type. Each ADT object has a copy constructor for duplicating an existing instance of an object. User defined functions include transform functions and predicates.

The following example SQL (Structured Query Language) statements manipulate ADT objects:

CREATE ADT geoShape (area float, length float, mbr rectangle);
CREATE ADT circle UNDER geoShape (centerX int, centerY int, radius int);
CREATE TABLE geoTable( . . . , shape geoShape, . . . );
INSERT INTO geoTable VALUES ( . . . , area(geoShape(), 5), . . . ),
( . . . , centerX(circle(), 10), . . . );
SELECT area(shape) FROM geoTable WHERE . . . ;

The Create statement for the ADT geoShape creates a shape using parameters for area, length, and mbr (member). The Create statement for the ADT circle creates a circle, which is a shape that inherits the attributes of the ADT geoShape. The Create table geoTable statement creates a table that includes a column for geoShapes. The Insert statement then inserts data into the column for geoShapes. The Select statement selects the area attribute for a shape from the table geoTable.

Typically, an ADT object is stored either as a VARCHAR (variable character) type or as a BLOB (binary large object) type. When stored as a VARCHAR type, fast access to the ADT object is available; however, large ADT objects cannot be defined as they are limited by the page size of the database. When stored as a BLOB type, access is slower, but there is no size limit for the ADT object. Regardless of storage, ADT objects are advantageous in that they support inheritance, and, hence, better data modeling and data abstraction.

However, a problem arises in the development of application programs and external user defined functions (UDFs) in languages such as C++, Java, etc., using ADTs. User friendly and fast access to an ADT stored in a database can be provided using a library function associated with the ADT, wherein the library function is instantiated from a class definition associated with the ADT. For example, if there is an ADT called "Point" in the database, a library function corresponding to the ADT can be generated in a programming language such as C++, Java, etc.

Using this approach, the following problem is encountered. It is possible that the user has generated a library function corresponding to a specific ADT and is using the library function in an application program. The ADT may be subsequently modified in the database (e.g., by altering types). As a result, the library function used by the application program become outdated, and the library function must be re-generated for the ADT. If, by mistake, the library function is not re-generated, there is a risk of the application program crashing or the database system crashing (e.g., if running unfenced UDFs).

Thus, there is a need in the art for a mechanism by which the use of outdated library functions to access the database ADTs can be detected.

SUMMARY OF THE INVENTION

To overcome the limitations in the prior art described above, and to overcome other limitations that will become apparent upon reading and understanding the present specification, the present invention discloses a method, apparatus, and article of manufacture for providing to a signature hash for checking versions of abstract data types. An identifier is constructed for the abstract data type that is substantially unique to the abstract data type, wherein the identifier comprises a concatenation of various attributes for the abstract data type. The constructed identifier is hashed to generate a signature hash value for the abstract data type, which is stored both in the database as meta-data and a class definition for the abstract data type. When the class definition is instantiated as a library function, it accesses the signature hash value from the database and compares it to the signature hash value from the class definition in order to verify that the class definition is not outdated. The class definition is outdated when the abstract data type has been altered without the signature hash value being re-generated and restored in the database and the class definition.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention describes a method for using a value stored in the database that provides a unique signature hash value for the ADT. A library function for the ADT also stores a signature hash value for the ADT, by means of an instantiated class definition for the ADT. When the library function accesses the database ADT, the first action it takes is to compare the signature hash value from the database with the signature hash value from the class definition. If the signature hash values match, the library function being used is not outdated.

On the other hand, if the database ADT has been altered (by either dropping and recreating the ADT or by using the "alter type . . . " statement), then the structure of the ADT would have changed and the database will contain a new signature hash value. The probability of this new signature hash value matching with any of the existing signature hash values is so low that, for all practical purposes, the library function can be declared to be outdated (and a warning generated for the user to recreate the library function). Thus, by storing the signature hash value in the database, the ADT can be quickly checked for validity and correspondence with the signature hash value stored in the associated library function.

Hardware and Software Environment

Figure 1:
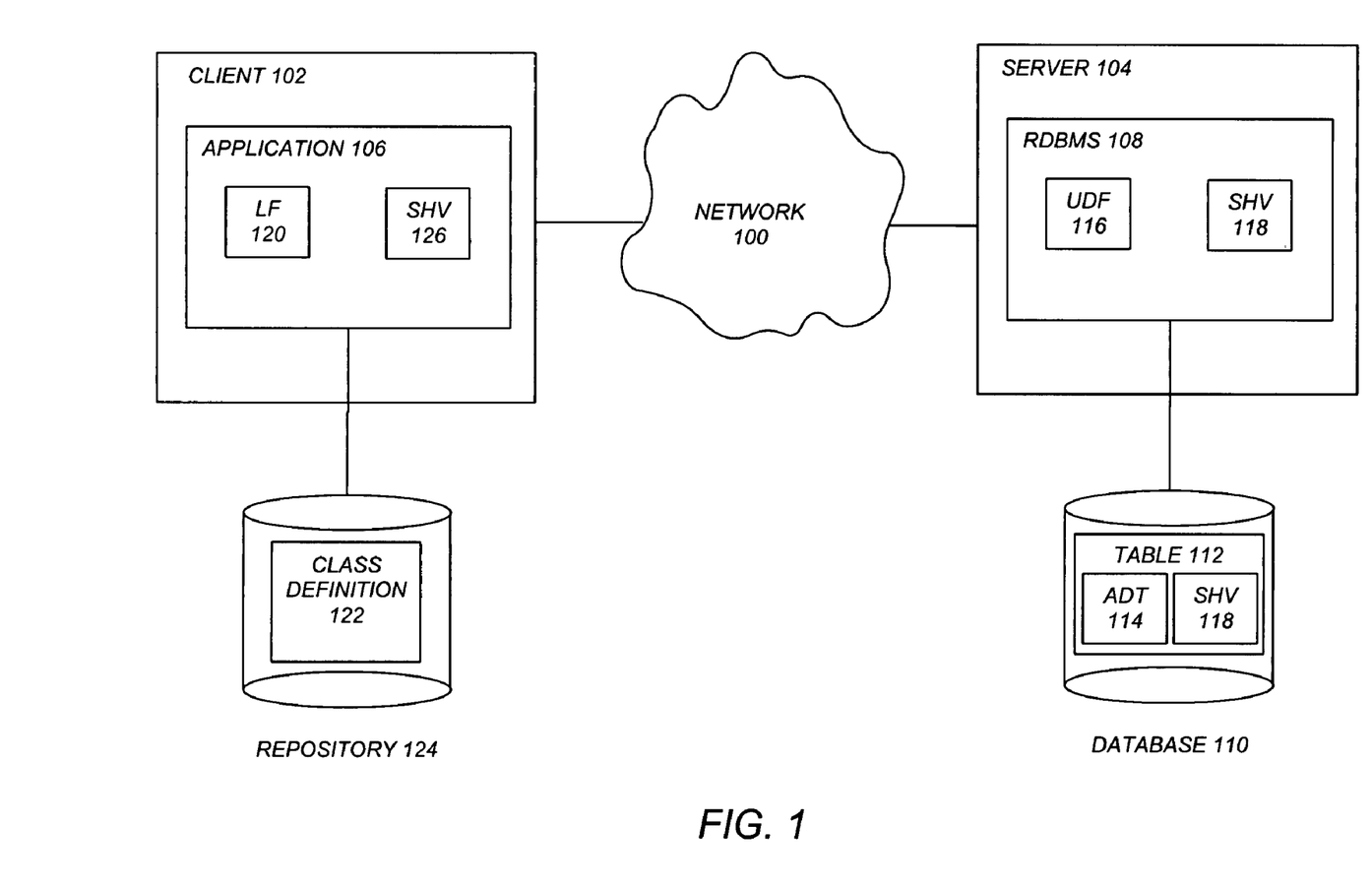
FIG. 1 is a block diagram illustrating an exemplary hardware and software environment used to implement the preferred embodiment of the invention.

FIG. 1 is a block diagram illustrating an exemplary hardware and software environment used to implement the preferred embodiment of the invention. A network 100 interconnects one or more client computers 102 and server computers 104. Both the client computers 102 and the server computer 104 are typically comprised of one or more processors, random access memory (RAM), read-only memory (ROM), and other components such data storage devices and data communications devices.

At least one of the client computers 102 executes an application program 106, which interfaces to a Relational Database Management System (RDBMS) 108 executed by the server computer 104. The RDBMS 108 accesses a database 110 that includes one or more tables 112 that store one or more Abstract Data Types (ADTs) 114. Generally, the ADT 114 is retrieved by means of a UDF 116 executed by the RDBMS 108, and then is provided to the application program 106 in some manner. In the preferred embodiment of the present invention, a signature hash value (SHV) 118 is stored in the database 110, for example, as metadata, although other embodiments may store the signature hash value 118 in other formats. The application program 106 instantiates a corresponding library function (LF) 120 from a class definition 122 stored in a repository 124. The library function 120 also stores a signature hash value (SHV) 126. When the library function 120 receives the ADT 114 from the RDBMS 108, the first action it takes before using the ADT 114 instance is to compare the signature hash value 118 stored in the database 110 with the signature hash value 126 stored in the library function 120. If the signature hash values 118 and 126 match, then the application program 106 can be reasonably certain that the library function 120 is not outdated, and may be safely used with the ADT 114.

On the other hand, if the database ADT 114 has been altered (by either dropping and recreating the ADT 114 or by using the "alter type . . . " statement), then the structure of the ADT 114 would have changed and the database 110 will contain a new signature hash value 118. The probability of this new signature hash value 118 matching with any of the existing signature hash values 118 or 126 is so low that, for all practical purposes, the library function 120 can be declared to be outdated (and a warning generated for the user to recreate the library function 120). Thus, by storing the signature hash value 118 in the database 110, the ADT 114 can be quickly checked for validity and correspondence with the signature hash value 126 stored in the associated library function 120.

All of these various components 106–126 interact to provide the functions of the preferred embodiment of the present invention. Moreover, these various components 108–126 each comprise logic and/or data that are tangibly embodied in or retrievable from a device, medium, or carrier, e.g., a memory, a data storage device, a data communications device, or other device, etc. Moreover, this logic and/or data, when read, executed, and/or interpreted by a computer, causes the computer to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Those skilled in the art will recognize that any combination of the above components, or any number of different components, including different computers, peripherals, devices, logic, and/or data, may be used to implement the present invention, so long as similar functions are performed thereby. For example, a distributed system is not necessary, and all of the components could be executed by the same computer 102 or 104.

Signature Hash Value

The signature hash values 118 and 126 are computed by first constructing an identifier for a given ADT 114 and then computing the signature hash values 118 and 126 based on this identifier using a selected hash function. In the preferred embodiment, the identifier comprises a byte string of indeterminate length, although other embodiments may use other types of identifiers. Moreover, any number of different hash functions may be used to generate the signature hash values 118 and 126, so long as they generate a substantially unique signature hash value 118 and 126 from the identifier.

The computation is performed when the ADT 114 is created. Thereafter, when a class definition 122 is created for the ADT 114, the signature hash value 126 is "hardcoded" into the class definition 122, so that it is later accessible to the library function 120 instantiated from the class definition 122. Thereafter, whenever the library function 120 accesses the ADT 114, it compares its signature hash value 126 with the signature hash value 118 stored in the database 110. If the signature hash values 118 and 126 match, then there is a very high probability that the library function 120 is consistent with the ADT 114. If the signature hash values 118 and 126 do not match, it is highly likely that the library function 120 needs to re-instantiate the class definition 122 associated with the ADT 114.

As noted above, the identifier used for computing the signature hash values 118 and 126 must be unique for a given ADT 114. Following is a Backus-Naur Form (BNF) grammar for an exemplary byte string that comprises the identifier used for computing the signature hash values 118 and 126 according to the preferred embodiment of the present invention:

```
// The signature concatenates the supertype_info and the type_info
   (if any).
signature ::= supertype_info type_info
// If this is a root type or super_type ADT use U32BIT (unsigned 32 bit)
// with all zeros. If this is a root type or super_type ADT use unsigned
   32 bit with all zeros
super_type_info ::= 0x00000000
// Use the signature of the supertype. As a result, the signature changes
// every time the name of any of the supertypes change (e.g., for
// supertypes such as PolarPoint vs. CartesianPoint, which can have the
// exact same structure but different names and different meaning).
supertype_signature_hash
// Signature hash value of the supertype
supertype_signature_hash ::= U32BIT
// Type_info is a concatenation of various information concerning the
// ADT, wherein num_attributes is the total number of attributes in the
   ADT
type_info ::=   schema_name
                type_name
                num_attributes
                metaFlagArray
                attribute_info_n
// Array of metaflags for all attributes
metaFlagArray ::= metaflag*
//
attribute-info_n ::=   attribute_info
                       attribute_info_n
// attribute_info for fixed length base types (int, bigint, smallint,
// timestamp, date, float, real)
attribute_info ::= attribute_name
// attribute_info for variable length base types (char, varchar, graphic,
   vargraphic)
attribute_name length
// attribute_info for lob types
attribute_name lob_length
// attribute_info for decimal types
attribute_name precision_scale
// attribute_info for ADT/REF types
attribute_name attribute_schema attribute_type_name
// Lengths may be U32BIT (unsigned 32 bit values), U16BIT (unsigned
// 16 bit values), or U8BIT (unsigned 8 bit values)
length ::= U16BIT
lob_length ::= U32BIT
precision ::= U8BIT
scale ::= U8BIT
// Name of schema for this type
schema_name ::= name
```

```
-continued

// Name of type
type_name ::= name
// Name of attribute
attribute_name ::= name
// Name of the schema for this attribute type
attribute_schema_name ::= name
// Name of the type for this attribute
attribute_type_name ::= name
// Names (including schema names, type names, attribute names)
// are represented using their length and the name string
name ::= name_length name_string
name_length ::= U8BIT
```

Logic of the Preferred Embodiment

Figure 2:
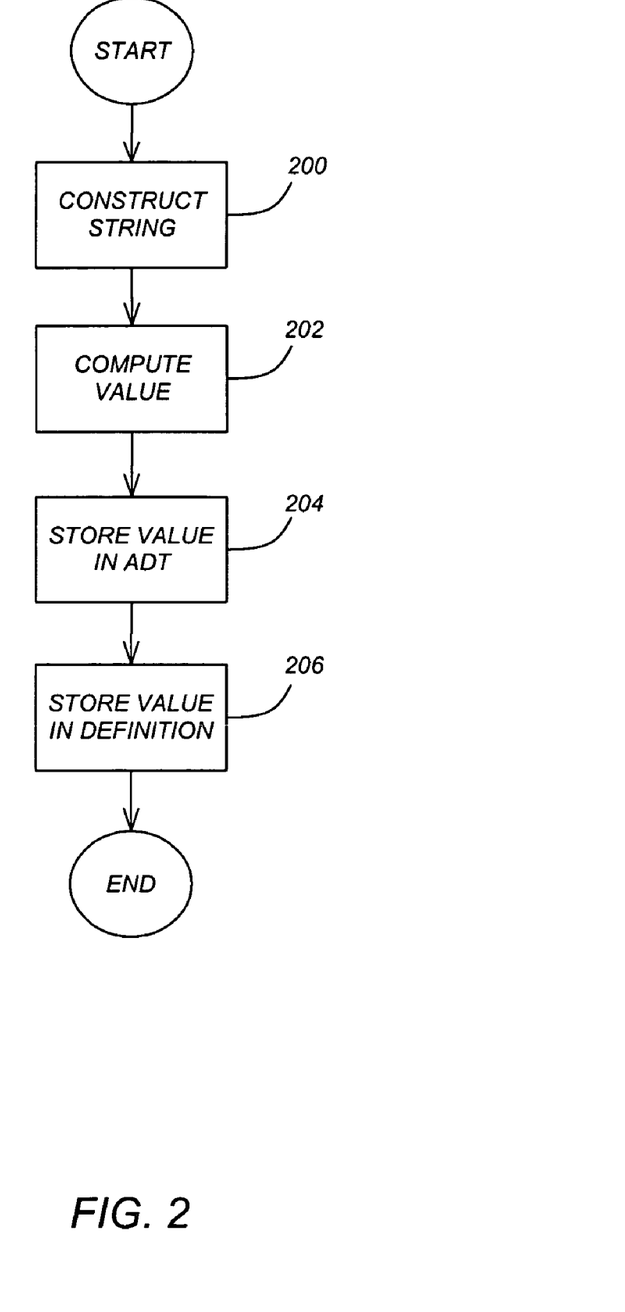
FIG. 2 is a flowchart illustrating the logic of creating signature hash values according to the preferred embodiment of the present invention.

FIG. 2 is a flowchart illustrating the logic of creating the signature hash values 118 and 126 according to the preferred embodiment of the present invention.

Block 200 represents the construction of an identifier for a given ADT 114. As indicated in the BNF above, the identifier is a byte string that comprises a concatenation of various attributes for the ADT 114, including: the schema name, the type name, the number of attributes, a constructed "meta" flag, and attribute information (i.e., for each attribute, its name, its length, its type, its schema (if pertinent), its precision (if pertinent), and its scale (if pertinent).

Block 202 represents the computation of signature hash values 118 and 126 based on the constructed identifier, wherein the computation uses a selected hash function. Those skilled in the art will recognize that any number of different hashing functions may be used to generate the signature hash value 118 and 126, so long as they generate a substantially unique 32-bit signature hash value 118 and 126 from a byte string of indeterminate length.

Block 204 represented the storing of the signature hash value 118 into the database 110, for example, as metadata or in some other format.

Finally, Block 206 represents the storing of the signature hash value 126 in the class definition 122.

Figure 3:
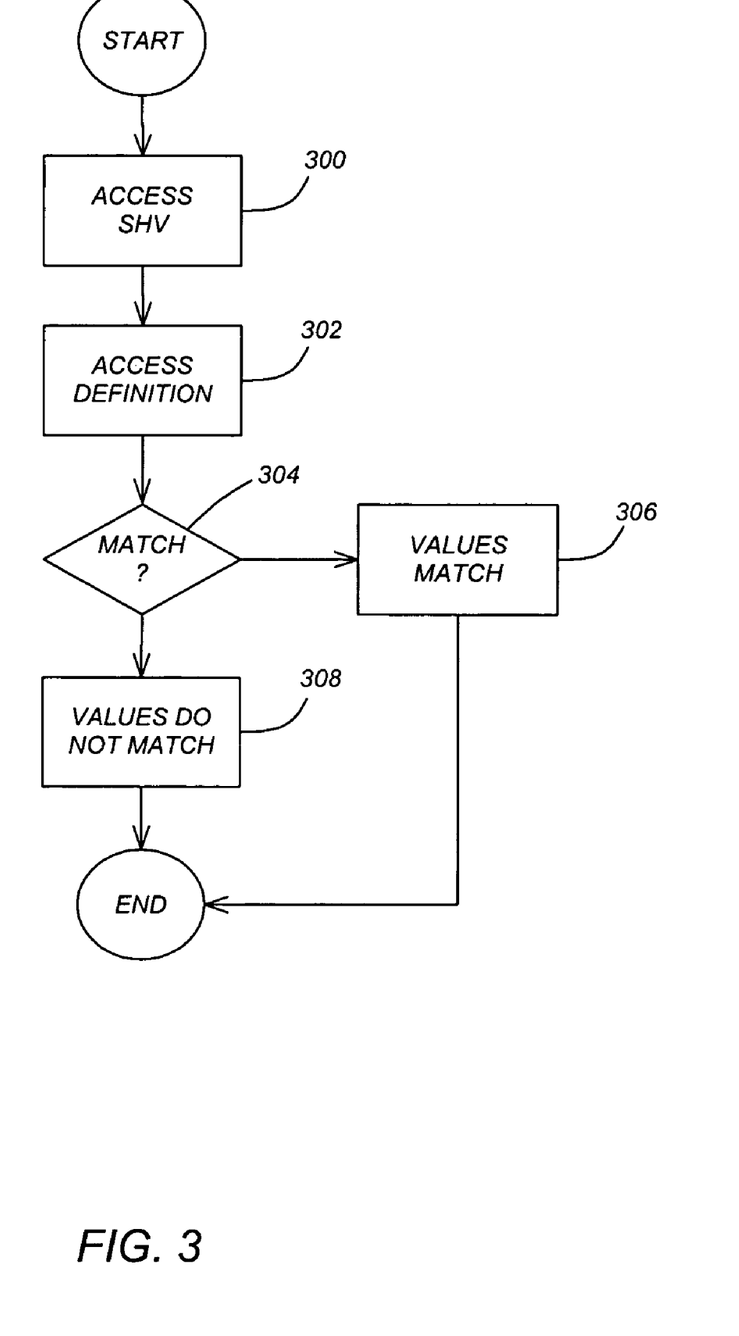
FIG. 3 is a flowchart illustrating the logic of matching signature hash values according to the preferred embodiment of the present invention.

FIG. 3 is a flowchart illustrating the logic of matching the signature hash values 118 and 126 according to the preferred embodiment of the present invention.

Block 300 represents the receipt of the ADT 114 by the library function 120, and the accessing of the signature hash value 118 from the database 110.

Block 302 represents the accessing of the "hardcoded" signature hash value 126 from the class definition 122.

Block 304 is a decision block that represents a comparison between the signature hash value 118 and the signature hash value 126. If the values match, then control transfers to Block 306; otherwise, control transfers to Block 308.

Block 306 represents a match in the comparison between the signature hash value 118 and the signature hash value 126.

Block 308 represents a lack of a match in the comparison between the signature hash value 118 and the signature hash value 126.

CONCLUSION

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to abstract data types, class definitions, and library functions.

In alternative embodiments of the present invention, other database management systems could be used. For example, the invention need not be restricted to a relational database management system. Instead, other types of databases and datastores could be used.

In summary, the present invention discloses a method, apparatus, and article of manufacture for providing to a signature hash for checking versions of abstract data types. An identifier is constructed for the abstract data type that is substantially unique to the abstract data type, wherein the identifier comprises a concatenation of various attributes for the abstract data type. The constructed identifier is hashed to generate a signature hash value for the abstract data type, which is then stored both in the database and a class definition for the ADT. When the class definition is instantiated as a library function, it accesses the abstract data type from the database, and compares the signature hash value from the database with the signature hash value from the class definition in order to verify that the class definition is not outdated. The class definition is outdated when the abstract data type has been altered without the signature hash value being re-generated and re-stored in the database and the definition.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for checking a version of an abstract data type stored in a database, comprising:
   (a) constructing an identifier for the abstract data type, wherein the identifier comprises a concatenation of information describing the abstract data type that is substantially unique to the abstract data type;
   (b) hashing the constructed identifier to generate a signature hash value for the abstract data type;
   (c) storing the signature hash value in the database and in a class definition for the abstract data type; and
   (d) comparing the signature hash value from the database with the signature hash value from the class definition after the class is instantiated in order to verify that the class definition is not outdated.

2. The method of claim 1, wherein the comparing step comprise:
   (1) instantiating the class definition as a library function;
   (2) accessing the abstract data type via the library function; and
   (3) comparing the signature hash value from the database and the signature hash value from the class definition in order to verify that the class definition is nor outdated.

3. The method of claim 1, wherein the class definition is outdated when the abstract data type has been altered without the signature hash value being re-generated and re-stored in the database and the class definition.

4. The method of claim 1, wherein the abstract data type is stored in a relational database.

5. A method for generating a signature hash value for checking a version of an abstract data type stored in databases, comprising:
   (a) constructing an identifier for the abstract data type, wherein the identifier comprises a concatenation of information describing the abstract data type that is substantially unique to the abstract data type;
   (b) hashing the constructed identifier to generate a signature hash value for the abstract data type; and
   (c) storing the signature hash value in the database and a class for the abstract data type.

6. A method for verifying a signature hash value for checking a version of an abstract data type stored in a database, comprising:
   (a) accessing a first signature hash value from the database and a second signature hash value from a class definition for the abstract data type, wherein the first and second signature hash values have been constructed from an identifier for the abstract data type, the identifier comprises a concatenation of information describing the abstract data type that is substantially to the abstract data type, and the identifier has been hashed to generate the first and second signature hash values; and
   (b) comparing the first signature hash value with the second signature hash value after the class definition is instantiated in order to verify that the class definition is not outdated.

7. The method of claim 6, wherein the accessing step comprise:
   (1) instantiating the class definition as a library function; and
   (2) accessing the abstract data type via the library function.

8. The method of claim 6, wherein the class definition is outdated when the abstract data type has been altered without the signature hash value being re-generated and re-stored in the database and the class definition.

9. An apparatus for checking a version of an abstract data type stored in a database, comprising:
   (a) means for constructing an identifier for the abstract data type, wherein the identifier comprises a concatenation of information describing the abstract data type that is substantially unique to the abstract data type;
   (b) means for hashing the constructed identifier to generate a signature hash value for the abstract data type;
   (c) means for storing the signature hash value in the database and in a class definition for the abstract data type; and
   (d) means for comparing the signature hash value from the database and the signature hash value from the class definition after the class definition is instantiated in order to verify that the class definition is not outdated.

10. The apparatus of claim 9, wherein the means for comparing comprise:
    (1) means for instantiating the class definition as a library function;
    (2) means for accessing the abstract data type via the library function; and
    (3) means for comparing the signature hash value from the database and the signature hash value from the class definition in order to verify that the class definition is not outdated.

11. The apparatus of claim 9, wherein the class definition is outdated when the abstract data type has been altered without the signature hash value being re-generated and re-stored in the database and the class definition.

12. The apparatus of claim 9, wherein the abstract data type is stored in a relational database.

13. An apparatus for generating a signature hash value for checking a version of an abstract data type stored in databases, comprising:
   (a) means for constructing an identifier for the abstract data type, wherein the identifier comprises a concatenation of information describing the abstract data type that is substantially unique to the abstract data type;
   (b) means for hashing the constructed identifier to generate a signature hash value for the abstract data type; and
   (c) means for storing the signature hash value in the database and a class definition for the abstract data type.

14. An apparatus for verifying a signature hash value for checking a version of an abstract data type stored in a database, comprising:
   (a) means for accessing a first signature hash value from the database and a second signature hash value from a class definition for the abstract data type, wherein an identifier is constructed for the abstract data type, the identifier comprises a concatenation of information describing the abstract data type that is substantially unique to the abstract data type, and the identifier is hashed to generate the first and second signature hash values; and
   (b) means for comparing the first signature hash value with the second signature hash value after the class definition is instantiated in order to verify that the class definition is not outdated.

15. The apparatus of claim 14, wherein the means for accessing comprise:
   (1) means for instantiating the class definition as a library function; and
   (2) means for accessing the abstract data type via the library function.

16. The apparatus of claim 14, wherein the class definition is outdated when the abstract data type has been altered without the signature hash value being re-generated and re-stored in the database and the class definition.

17. An article of manufacture embodying logic for performing a method for checking a version of an abstract data type stored in a database, the method comprising:
   (a) constructing an identifier for the abstract data type, wherein the identifier comprises a concatenation of information describing the abstract data type that is substantially unique to the abstract data type;
   (b) hashing the constructed identifier to generate a signature hash value for the abstract data type;
   (c) storing the signature hash value in the database and in a class definition for the abstract data type; and
   (d) comparing the signature hash value from the database with the signature hash value from the class definition after the class is instantiated in order to verify that the class definition is not outdated.

18. The method of claim 17, wherein the comparing step comprise:
   (1) instantiating the class definition as a library function;
   (2) accessing the abstract data type via the library function; and
   (3) comparing the signature hash value from the database and the signature hash value from the class definition in order to verify that the class definition is not outdated.

19. The method of claim 17, wherein the class definition is outdated when the abstract data type has been altered without the signature hash value being re-generated and re-stored in the database and the class definition.

20. The method of claim 17, wherein the abstract data type is stored in a relational database.

21. An article of manufacture embodying logic for perform a method for generating a signature hash value for checking a version of an abstract data type stored in databases, comprising:
   (a) constructing an identifier for the abstract data type, wherein the identifier comprises a concatenation of information describing the abstract data type that is substantially unique to the abstract data type;
   (b) hashing the constructed identifier to generate a signature hash value for the abstract data type; and
   (c) storing the signature hash value in the database and a class definition for the abstract data type.

22. An article of manufacture embodying logic for performing a method for verifying a signature hash value for checking a version of an abstract data type stored in a database, comprising:
   (a) accessing a first signature hash value from the database and a second signature hash value from a class definition for the abstract data type, wherein an identifier is constructed for the abstract data type, the identifier comprises a concatenation of information describing the abstract data type that is substantially unique to the abstract data type, and the identifier is hashed to generate the first and second signature hash values; and
   (b) comparing the first signature hash value with the second signature hash value after the class definition is instantiated in order to verify that the class definition is not outdated.

23. The method of claim 22, wherein the accessing step comprise:
   (1) instantiating the class definition as a library function; and
   (2) accessing the abstract data type via the library function.

24. The method of claim 22, wherein the class definition is outdated when the abstract data type has been altered without the signature hash value being re-generated and re-stored in the database and the class definition.

25. Ar least one data structure stored in a memory for use in checking a version of an abstract data type stored in a database, the data structure comprising a signature hash value for the abstract data type generated from an identifier consumed for the abstract data type, wherein the identifier comprises a concatenation of information describing the abstract data type that is substantially unique to the abstract data type and the identifier is hashed to generate the signature hash value for the abstract data type.

26. The data structure of claim 25, wherein the signature hash value is stored in the database.

27. The data structure of claim 26, wherein the signature hash value is stored in a class definition for the abstract data type.

28. The data structure of claim 26, wherein the signature hash value from the database is compared to the signature hash value from the class definition after the class definition is instantiated in order to verify that the class definition is not outdated.

29. The data structure of claim 28, wherein the class definition is outdated when the abstract data type has been altered without the signature hash value being re-generated and re-stored in the database and the class definition.

30. The data structure of claim 25, wherein the abstract data type is stored in a relational database.

31. The method of claim 1, wherein the information describing the abstract data type includes schema name, type name, number of attributes and attribute information for each attribute of the abstract data type.

32. The method of claim 5, wherein the information describing the abstract data type includes schema name, type name, number of attributes and attribute information for each attribute of the abstract data type.

33. The method of claim 6, wherein the information describing the abstract data type includes schema name, type name, number of attributes and attribute information for each attribute of the abstract data type.

34. The apparatus of claim 9, wherein the information describing the abstract data type includes schema name, type name, number of attributes and attribute information for each attribute of the abstract data type.

35. The apparatus of claim 13, wherein the information describing the abstract data type includes schema name, type name, number of attributes and attribute information for each attribute of the abstract data type.

36. The apparatus of claim 14, wherein the information describing the abstract data type includes schema name, type name, number of attributes and attribute information for each attribute of the abstract data type.

37. The method of claim 17, wherein the information describing the abstract data type includes schema name, type name, number of attributes and attribute information for each attribute of the abstract data type.

38. The method of claim 21, wherein the information describing the abstract data type includes schema name, type name, number of attributes and attribute information for each attribute of the abstract data type.

39. The method of claim 22, wherein the information describing the abstract data type includes schema name, type name, number of attributes and attribute information for each attribute of the abstract data type.

40. The method of claim 25, wherein the information describing the abstract data type includes schema name, type name, number of attributes and attribute information for each attribute of the abstract data type.

* * * * *

UNITED STATES PATENT AND TRADEMARK OFFICE
CERTIFICATE OF CORRECTION

PATENT NO. : 6,973,572 B1 Page 1 of 1
APPLICATION NO. : 09/514607
DATED : December 6, 2005
INVENTOR(S) : Elliot et al.

It is certified that error appears in the above-identified patent and that said Letters Patent is hereby corrected as shown below:

<u>Column 7,</u>

Line 65, Claim 2, "nor" should read --not--.

<u>Column 8,</u>

Line 25, Claim 6, "substantially to" should read --substantially unique to--.

Signed and Sealed this

Twenty-second Day of August, 2006

JON W. DUDAS
*Director of the United States Patent and Trademark Office*